Dec. 30, 1958 H. J. COLLINS 2,866,396
LENS CAP ARRANGEMENT FOR STEREO CAMERAS
Filed Dec. 13, 1956 2 Sheets-Sheet 1

INVENTOR.
HARRY J. COLLINS
BY
John W. Michael
ATTORNEY

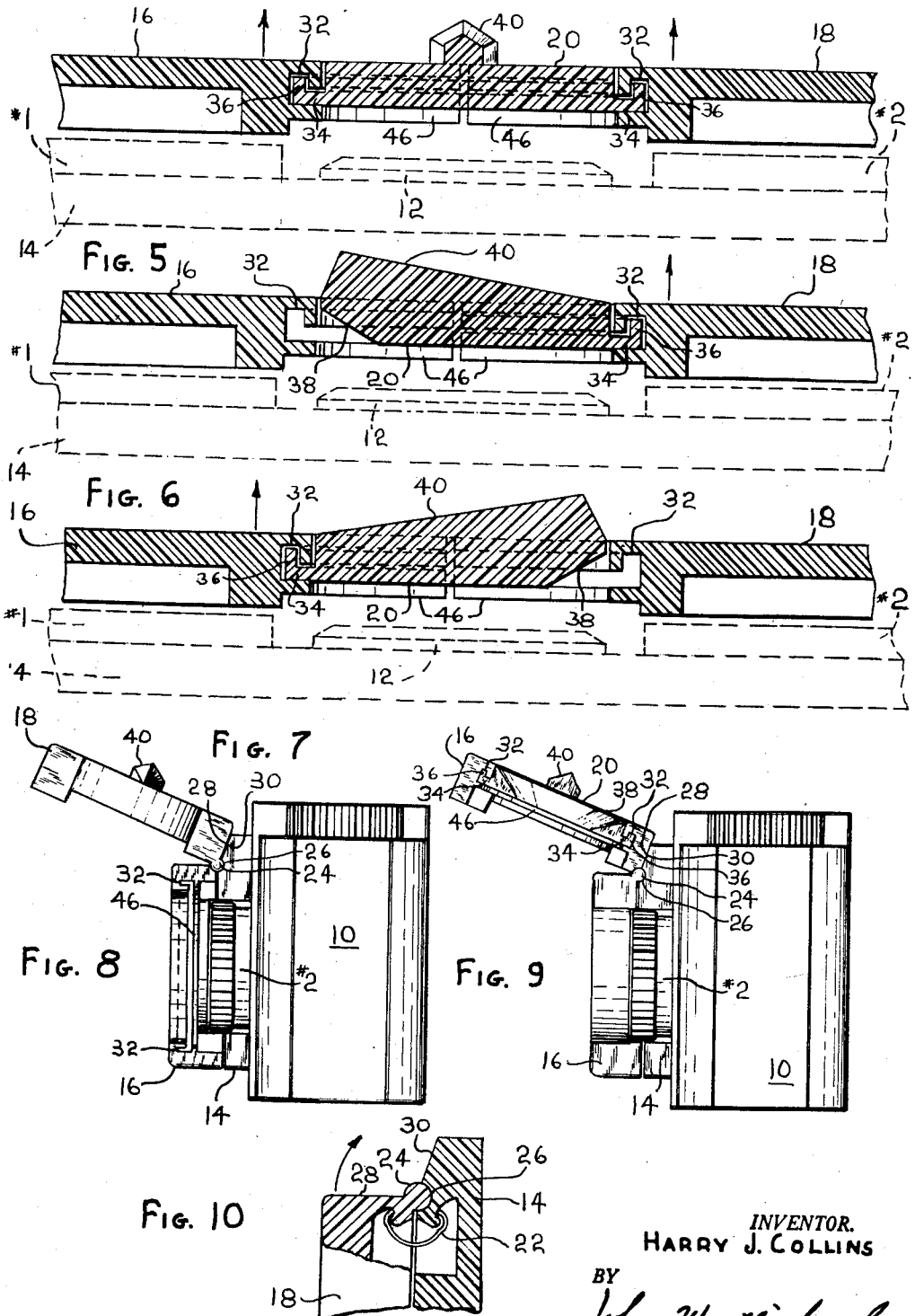

United States Patent Office 2,866,396
Patented Dec. 30, 1958

2,866,396
LENS CAP ARRANGEMENT FOR STEREO CAMERAS

Harry J. Collins, Milwaukee, Wis., assignor to Richard P. Herzfeld, Milwaukee, Wis.

Application December 13, 1956, Serial No. 628,100

10 Claims. (Cl. 95—18)

This invention relates to stereo cameras and particularly to provision of means facilitating making single frame exposures in lieu of the usual stereo pair.

This invention is an improvement on the structure of Herzfeld Patent No. 2,725,804 showing an attachment for cooperating with a modified lens cap on a stereo camera to facilitate making single frame exposures rather than the usual stereo pair. It will be appreciated that there are occasions when the subject matter to be photographed does not lend itself to or would not be improved by stereo reproduction and in such instances it is desirable to make the conventional two dimensional exposure. With the structure shown in the Herzfeld patent, this can be done with a minimum possibility of error using the stereo camera for taking the two dimensional pictures. Thus, the stereo camera becomes a dual purpose camera. The Herzfeld structure not only calls for a modified lens cap structure but also calls for additional mechanism cooperating with the lens cap. The present invention is simpler than the Herzfeld structure and can be produced at lower cost. Furthermore, the apparatus according to this invention better lends itself to styling which is an important factor in merchandising cameras.

The principal object of this invention is to improve upon the patented Herzfeld structure.

Another object of this invention is to provide a simple, low cost lens cap structure for stereo cameras which can optionally be operated as a one piece unit or as a split lens cap permitting and facilitating the making of single frame exposures rather than stereo pairs.

A further object of this invention is to provide a lens cap arrangement of simple design which will enhance the appearance of cameras on which it is attached.

Still another object is to provide a lens cap arrangement of the type described which can be original equipment on the camera or may be installed in the field.

Other objects and advantages will be pointed out in, or be apparent from, the specification and claims, as will obvious modifications of the single embodiment shown in the drawings in which:

Figure 5 is a section taken as indicated by line 5—5 on Figure 1 in which all parts of the lens cap are interlocked for movement in unison;

Figure 6 is similar to Figure 5 but shows the central portion of the lens cap turned so that only the right hand side and the center portion will open in unison;

Figure 7 is similar to Figure 6 but shows the central portion of the lens cap turned to cooperate with the left hand portion of the lens cap for movement therewith;

Figure 8 is an end view of the camera corresponding to the view in Figure 6;

Figure 9 is similar to Figure 8 but correpsonds to Figure 7; and

Figure 10 shows the details of the toggle acting hinge structure.

At the outset it should be noted that the present lens cap has been designed to serve as an original or replacement lens cap for the usual lens cap employed on the well known Realist stereo camera. The Realist camera employs a viewing lens between the two taking lenses, which is an ideal location for the viewing lens in that it eliminates parallax problems as much as possible. The central portion of the present lens cap is designed to overlie the viewing lens and to be moved out of the field of view of the viewing lens when the camera is in use. The present lens cap is not, however, limited to use with such stereo cameras since the principles involved here are fully applicable whether or not the central portion of the lens cap overlies the viewing lens. Thus, if the viewing lens is located at another portion of the camera body, this will not affect the applicability of the present lens cap structure. The present lens cap is eminently suited for use on the Realist camera since it can be used as a complete replacement for the lens cap currently used on the Realist. Other cameras may require a certain degree of modification in order to mount this lens cap.

Figure 1:
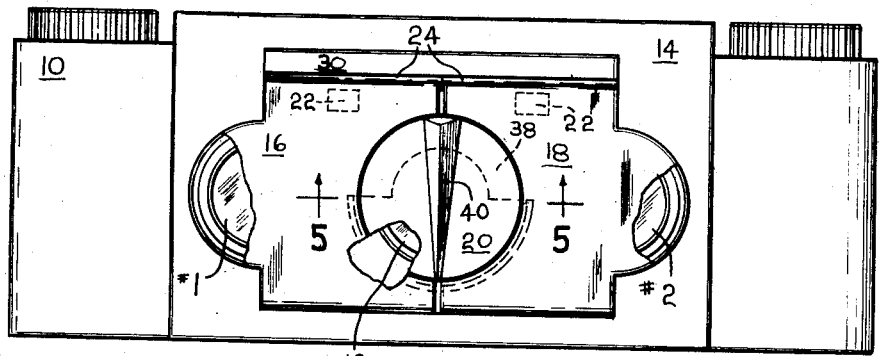
Figure 1 is a front elevation of a Realist camera provided with the present lens cap and has parts broken away.
Figure 2:
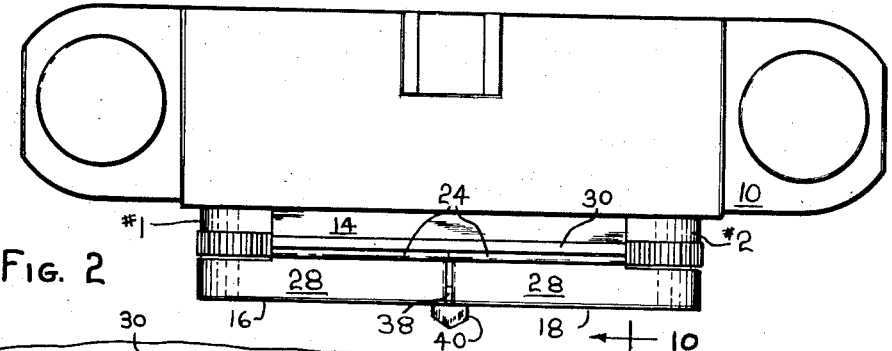
Figure 2 is a plan view of the camera.

Referring now to the drawings in detail, body 10 is provided with the usual spaced taking lenses labelled No. 1 and No. 2 with a viewing lens 12 located between the taking lenses. The No. 1 taking lens appears at the left in Figure 1 and is generally known as the right hand lens, since it corresponds to the right eye. Similarly the No. 2 lens at the right in Figure 1 is known as the left hand lens. The present three part lens cap assembly is mounted on fixed lens board 14. The left hand (with reference to Figure 1) portion 16 overlies lens No. 1, while right hand portion 18 overlies lens No. 2. The third part is the circular intermediate piece 20 which overlies viewing lens 12. The left and right hand parts 16 and 18 are each secured to the fixed lens board by means of a U-shaped spring 22 as may be seen in Figure 10. Thus, each of the left and right hand parts is provided with a longitudinal rib 24 along the upper edge thereof and received in groove 26 in the lens board 14. The U-shaped spring 22 engages both the fixed lens board and the lens cap and has a toggle action either biasing the lens cap to the lens covering position or to an elevated position which may be seen in Figures 8 and 9 at which time the upper surface 28 abuts the sloping surface 30 on the lens board. Thus, each of the left and right hand lens cap portions are independently hinged on the lens board.

Each portion is provided with a semi-circular cutout which cooperates to receive the intermediate portion 20. The intermediate portion is adapted to be interlocked with either or both of the side portions. As may be seen in Figure 4, the cutouts are provided with inwardly opening generally C-shaped recesses 32 which are adapted to receive the semi-anuular flange 34 projecting from the center cap 20 and provided with a lip 36 projecting up into the C-shaped opening to provide an interlocking engagement. This flange 34 extends approximately 180° of the circumference of the center portion 20. The other 180° of the center cap is provided with a tapered undercut 38 which may be seen in Figures 6 and 7 and in dotted lines in Figures 1 and 3. The top surface of the center portion 20 is provided with an indicator 40 which is somewhat in the form of an arrowhead. When this indicator is positioned to point directly down as in Figure 1 or directly up, one half of the semi-annular flange 34 will engage each of the left and right hand lens caps 16, 18. Therefore, lifting either portion of the lens cap will cause the entire lens cap assembly to move upwardly to expose the lenses in unison. However, if the indicator is turned to the position illustrated in Figures 3 and 7, the peripheral flange will engage only the left lens cap portion 16 and, therefore, when this portion is lifted it will expose only the No. 1 taking lens and viewing lens 12 leaving the No. 2 lens capped, thus making it possible to expose a single frame through the No. 1 lens. Now then, if the indicator is turned to point in the direction opposite that illustrated in Figure 3 to assume the position shown in Figure 6, it will be apparent that the No. 2 lens and the viewing lens 12 will be exposed in unison while the No. 1 lens will remain capped. Of course, it is possible to lift the No. 1 lens cap 16 to also expose that lens, but it is felt that since this portion of the lens cap would move alone and not take with it the center lens cap this is sufficient warning to the photographer that he is operating the camera erroneously. Furthermore, the viewing lens would then be capped and this again would warn the photographer that an error is about to be committed.

Figure 3:
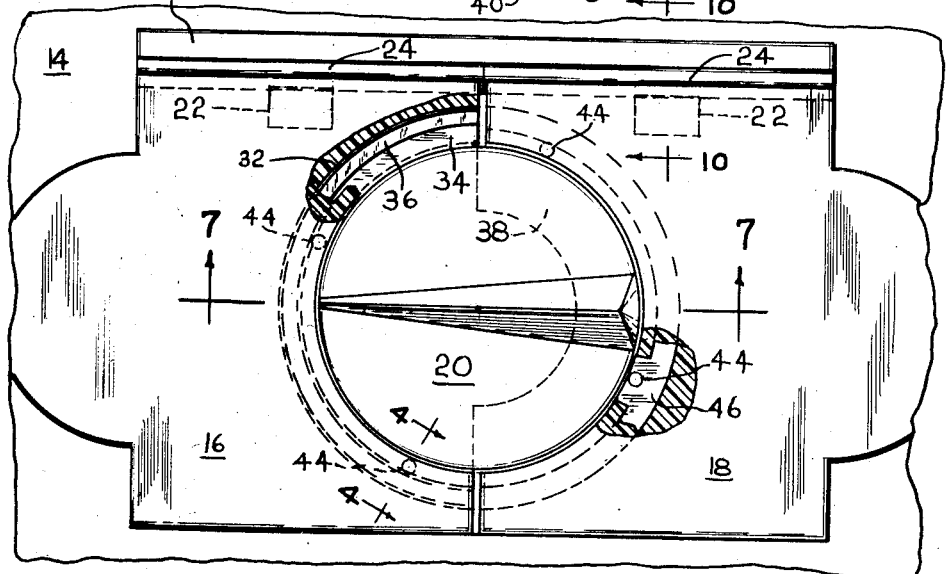
Figure 3 is an enlarged fragment of Figure 1 with parts broken away to show details of the structure.
Figure 4:
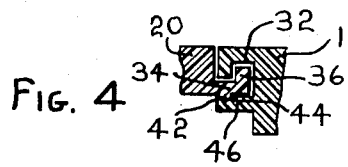
Figure 4 is a detailed section taken on line 4—4 of Figure 3 to show the arrangement of the detent arrangement for securing click stops in the various positions of the indicator portion of the lens cap.

In order to provide click stops at the various positions of the indicator and thus prevent inadvertent overlap, and thus malfunctioning of the device, I provide boss 42 at one location on the underside of the center part 20 and provide for detents 44 spaced at 90° intervals around the central opening and in the upper surface of the bottom flange 46 of the C shaped opening. It will be noted that since the cap is, in effect, split on a vertical axis, the detents 44 are rotated angularly to avoid the necessity of extreme precision when fitting the parts together. It will be appreciated also that the detents and the boss may be molded integrally. Thus, the entire assembly is made up of three parts, each of which can be molded as a single piece. The necessary spring action in obtaining the click stops is obtained through the resilient nature of the plastic. The engagement of boss 42 with detent 44 may be seen in Figures 3 and 4. In Figure 3 the boss and detent are engaged near the seven o'clock position positioning the pointer to aim at the No. 1 lens and lens cap 16.

While the initial mold cost is higher than a single piece lens cap the present structure is easy to mold and assemble. The left and right lens caps are first mounted by means of the U shaped springs. Then the center cap is merely turned into engagement with either side cap to complete the assembly. In use the three caps are used as a single unit for stereo photography. For single frame pictures either the left or right lens can be used first with the other used next before the film is transported. After exposing the first of the singles the indicator can be turned to indicate the lens to be used next to thus avoid confusion later on.

Although but one embodiment of the present invention has been illustrated and described, it will be apparent to those skilled in the art that various changes and modifications may be made therein without departing from the spirit of the invention or from the scope of the appended claims.

I claim:

1. A stereo attachment comprising a pair of lens caps adapted to be pivotally mounted on a camera for movement between the lens capping position and an open position, said lens caps being movable independently of one another, and means for coupling the lens caps together for conjoint movement, said coupling means comprising a member intermediate the two lens caps and adapted to overlie the viewing lens of a stereo camera, said intermediate member having a first position in which it couples the lens caps and being movable with the lens caps when they are coupled for conjoint movement, said intermediate member being movable to second and third positions in which the intermediate member is coupled to and movable with only one or the other of the lens caps.

2. An attachment according to claim 1 in which the intermediate member is generally circular in plan and is rotatable on its axis to its various positions.

3. A camera attachment according to claim 2 including stop means acting between the intermediate member and the lens caps to index the intermediate member at its various positions.

4. A stereo camera attachment comprising a pair of lens caps adapted to be pivotally mounted on a stereo camera for movement between lens capping and lens opening positions, said lens caps being movable independently of one another, and a member intermediate the lens caps and engageable with either or both the lens caps for conjoint movement with the lens cap with which it is engaged.

5. A camera attachment according to claim 4 in which said intermediate member is generally circular and is rotatable upon its axis.

6. Stereo camera attachment according to claim 5 in which stop means are provided between the intermediate member and the lens caps to index the intermediate member, and indicia means provided for indicating which of the lens caps is coupled to the intermediate member.

7. A stereo camera including a body having a pair of taking lenses, a pair of lens caps pivotally mounted on the body for independent movement between positions in which the lenses are open or capped, and an intermediate member adapted to be coupled with either lens cap alone or with both caps for conjoint movement between the capped and open positions with the lens cap to which it is coupled.

8. A stereo camera according to claim 7 in which the camera is provided with a viewing lens between the two taking lenses and the intermediate member acts as a lens cap for the viewing lens.

9. A stereo camera according to claim 8 including indexing means operable between the intermediate member and the lens caps for positioning the intermediate member for coupling with either one or the other or both of the lens caps and for indicating the status of the coupling.

10. A stereo camera according to claim 9 in which the intermediate member is coupled at all times to at least one of the lens caps.

References Cited in the file of this patent

UNITED STATES PATENTS 2,725,804  Herzfeld _____ Dec. 6 1955